(12) United States Patent
Chen

(10) Patent No.: US 6,261,113 B1
(45) Date of Patent: Jul. 17, 2001

(54) ELECTRICAL CONNECTOR HAVING IMPROVED ARRANGEMENT OF TERMINALS

(75) Inventor: Ming-Ching Chen, Tu-Chen (TW)

(73) Assignee: Hon Hai Precision Ind, Co., Ltd., Taipei Hsien (TW)

( * ) Notice: Subject to any disclaimer, the term of this patent is extended or adjusted under 35 U.S.C. 154(b) by 0 days.

(21) Appl. No.: 09/749,032

(22) Filed: Dec. 26, 2000

(30) Foreign Application Priority Data

Nov. 10, 2000 (TW) ................................... 9219490

(51) Int. Cl.[7] ........................................... H01R 13/15

(52) U.S. Cl. ............................. 439/260; 439/630

(58) Field of Search ....................... 439/630, 260, 439/188, 60

(56) References Cited

U.S. PATENT DOCUMENTS

| 5,169,345 | * | 12/1992 | Pernet | 439/630 |
| 5,320,552 | * | 6/1994 | Reichardt et al. | 439/630 |
| 5,707,245 | * | 1/1998 | Yamamoto et al. | 439/160 |
| 6,059,586 | * | 5/2000 | Watanabe et al. | 439/159 |
| 6,129,588 | * | 10/2000 | Chang | 439/630 |

* cited by examiner

*Primary Examiner*—Tho D. Ta
(74) *Attorney, Agent, or Firm*—Wei Te Chung

(57) ABSTRACT

An electrical connector (1) includes an insulative housing (10), a plurality of electrical first and second terminals (11, 12) insert-molded in the insulative housing and a tray (13) slidably mounted in the housing for receiving an electronic card (2). Each terminal has a solder portion (110, 120) at one end and a contact portion (112, 125) at an opposite end. The solder portions of the first and second terminals are laterally aligned in a single row. The second terminals are bent to position their contact portions in longitudinal alignment with the contact portions of corresponding first terminals.

1 Claim, 4 Drawing Sheets

ELECTRICAL CONNECTOR HAVING IMPROVED ARRANGEMENT OF TERMINALS

FIELD OF THE INVENTION

The present invention relates to an electrical connector for providing an interconnection between an electronic card and a printed circuit board, and particularly to an electrical connector having an improved arrangement of terminals.

BACKGROUND OF THE INVENTION

Conventional electrical connectors, such as those disclosed in U.S. Pat. Nos. 5,527,192 and 5,823,828, generally have a plurality of first and second terminals respectively mounted on two opposite sides of a housing. The first and second terminals are secured in the housing by way of insert molding.

Two sets of locating devices are required to be respectively placed on opposite sides of the mold for fixing the first and second terminals in the mold during manufacturing. With this design, the man-hour and monetary cost of the molding operation is relatively high.

This invention is directed to solving the above problems and satisfying the need for a simple and low-cost connector.

BRIEF SUMMARY OF THE INVENTION

A main object, therefore, of the present invention is to provide an improved arrangement of terminals to simplify the manufacturing process of an electrical connector.

An electrical connector in accordance with the present invention comprises an insulative housing mountable to a printed circuit board, a first and second pluralities of electrical terminals received in the insulative housing and a tray slidably mounted in the housing for retaining a subscriber identification module (SIM) card. Each terminal comprises a solder portion and a contact portion, wherein the solder portions of the first and second terminals are laterally aligned in a single row and the second terminals are bent so that the contact portions of the second terminals are longitudinally aligned with corresponding contact portions of the first terminals.

Other objects, advantages and novel features of the invention will become more apparent from the following detailed description when taken in conjunction with the accompanying drawings.

DETAILED DESCRIPTION OF THE INVENTION

Figure 1:
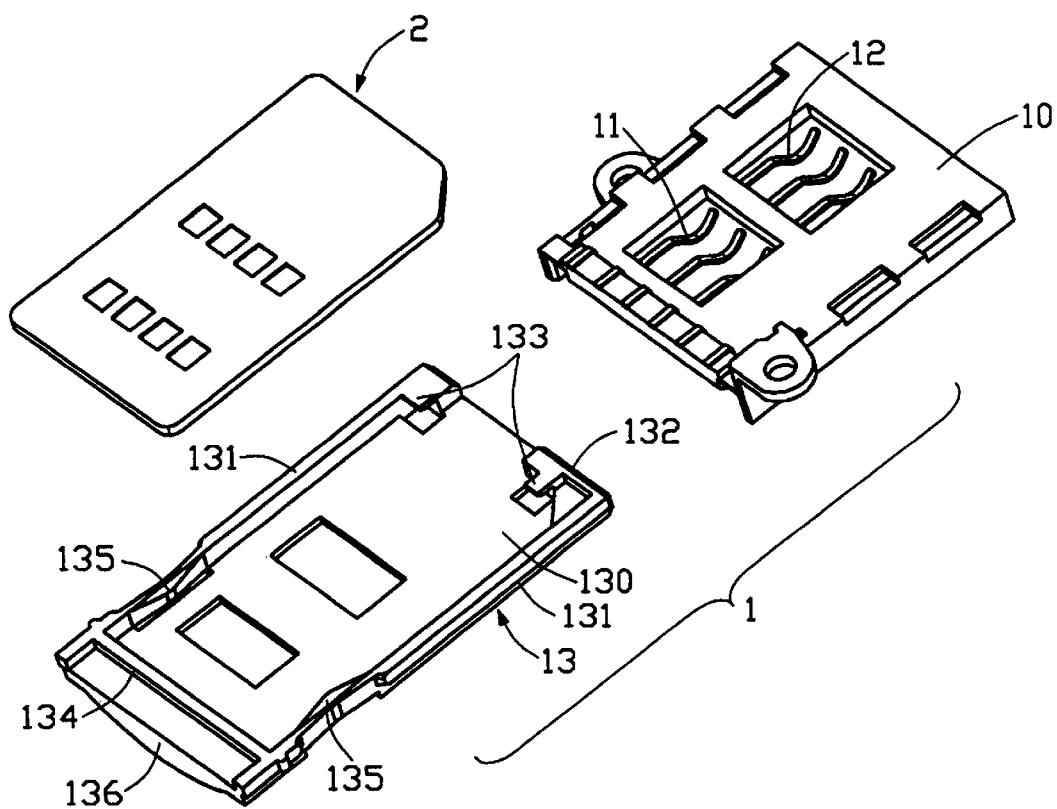
FIG. 1 is an exploded view of an electrical connector of the present invention and a subscriber identification module (SIM) card.

Referring to FIG. 1, an electrical connector 1 according to the present invention comprises an insulative housing 10, a plurality of electrical first and second terminals 11, 12 received in the housing 10, and a tray 13 for retaining a subscriber identification module (SIM) card 2.

Figure 2:
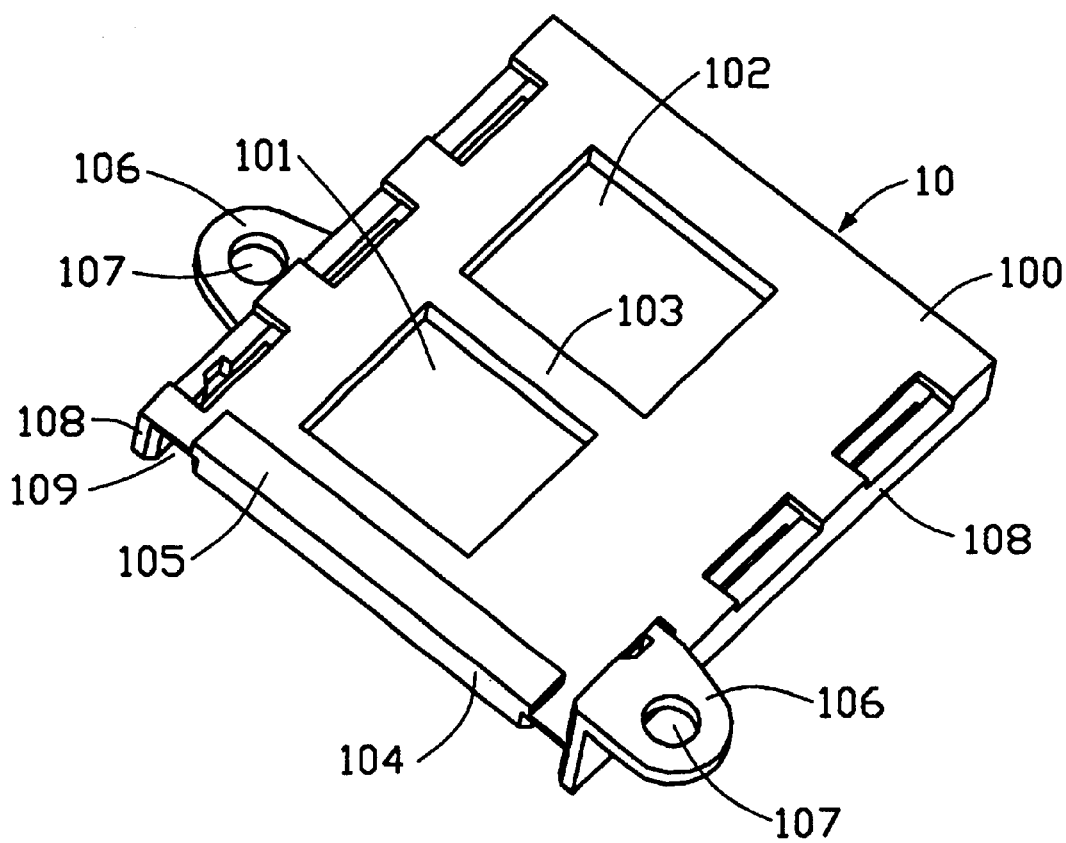
FIG. 2 is a perspective view of an insulative housing of the electrical connector.

Referring to FIG. 2, the insulative housing 10 comprises a rectangular base 100 and a pair of sidewalls 108 respectively depending from opposite sides of the base 100. A first and second rectangular openings 101, 102 are defined in the base 100 in juxtaposition, and a bar 103 is formed between the first and second openings 101, 102. A bearing rib 104 is formed at a front end of the base 100 and between the sidewalls 108. A soldering bar 105 connecting with the bearing rib 104 is formed on a top surface of the base 100. A pair of solder pads 106 are respectively provided on the sidewalls 108, one for fixing the housing 10 on a printed circuit board (PCB) (not shown) and the other for fixing the housing 10 on a shell of an electronic device (not shown). A hole 107 is defined in each solder pad 106. A pair of channels 109 is defined at both sides of the base 100 between the sidewalls 108 and the bearing rib 104 for guiding the tray 13.

Figure 3:
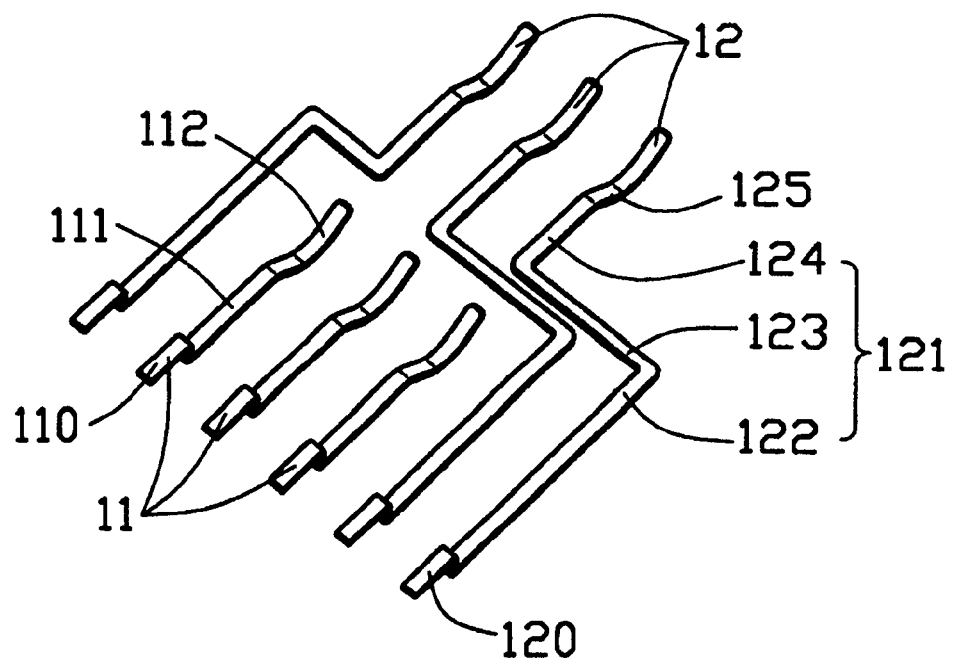
FIG. 3 shows terminals of the electrical connector.

Referring to FIG. 3, in the preferred embodiment, the plurality of first and second terminals 11, 12 are simultaneously stamped from a sheet of metal. Each first terminal 11 includes an arcuate contact portion 112 at a rear end thereof, a solder portion 110 at a front end thereof, and a planar portion 111 connecting the contact portion 112 with the solder portion 110.

Each second terminal 12 includes an arcuate contact portion 125 at a rear end thereof, a solder portion 120 at a front end thereof and a planar portion 121 connecting the contact portion 125 with the solder portion 120. The planar portion 121 comprises a first arm 122, a third arm 124 parallel to the first arm 122 and a second arm 123 perpendicular to and connecting a rear end of the first arm 122 with a front end of the third arm 124. The second terminals 12 have different shapes according to their respective locations.

The first and second terminals 11, 12 are insert-molded in the insulative housing 10. The first terminals 11 are arranged in a row, with the contact portions 112 of the first terminals 11 protruding into and extending from the first opening of the housing 10. The second terminals 12 are arranged at both sides of the row of first terminals 11 with the contact portions 125 of the second terminals 12 protruding into and extending from the second opening 102. The solder portions 110 of the first terminals 11 and the solder portions 120 of the second terminals 12 are laterally aligned in a common row on a top surface of the soldering bar 105. The second terminals 12 are of such a length and are bent in such a shape that they are routed to both sides of the row of first terminals 11 so that the contact portion 125 of each second terminal 12 longitudinally aligns with the contact portion 112 of a corresponding first terminal 11.

Referring to FIG. 1, the tray 13 is rectangular in shape and can be formed of an insulative material. The tray 13 includes a soleplate 130, a pair of sidewalls 131 protruding upwardly from opposite sides of the soleplate 130, a rear wall 132 and a transverse bar 134. A receiving chamber (not labeled) is defined between the soleplate 130, the sidewalls 131, the transverse bar 134 and the rear wall 132 for receiving the SIM card 2. Two holding blocks 133 protrude from the rear wall 132 for holding a side of the SIM card. Two plastic springs 135 are respectively formed on inner sides of the sidewalls 131. An actuating portion 136 is formed at a front end of the soleplate 130.

Figure 4:
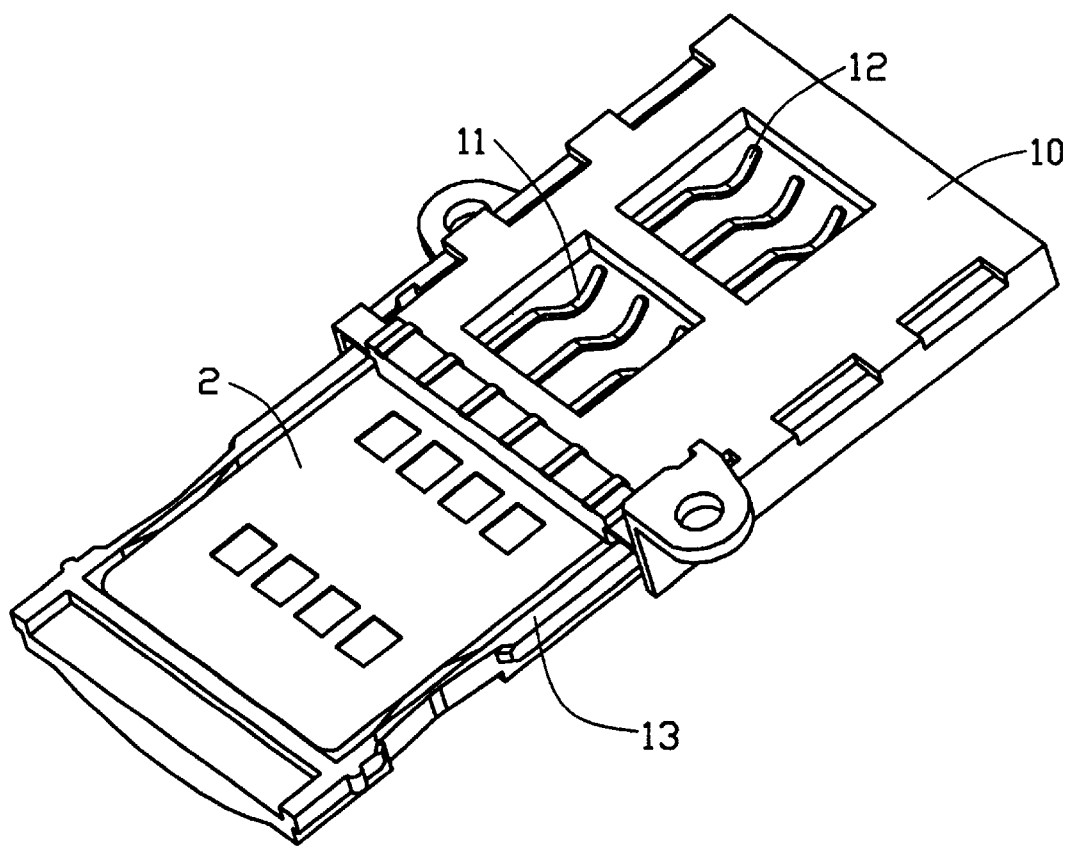
FIG. 4 is an assembled view of FIG. 1.

In assembly, referring to FIG. 4, the card 2 is received in the tray 13. The plastic springs 135 compress two sides of the card 2. A rearward end of the card 2 is held by the holding blocks 133, and a forward end abuts against the transverse bar 134.

The tray 13 is movably mounted in the housing 10 and slides, with the card 2 mounted therein, into the housing 10 by pushing the actuating portion 136 in a rearward direction into the housing 10. Each sidewall 131 of the tray 13 is respectively received in a corresponding channel 109. The tray 13 moves along the channels 109 until the bearing rib 104 abuts the transverse bar 134. The card 2 has contact areas on an outer face thereof which electrically contact corresponding first and second contact portions 112, 125.

In the present invention, the plurality of first and second terminals 11, 12 are formed at one time by metal stamping, and the first and second solder portions 110, 120 are located on the same side of the housing, so during insert molding, a locating device of a mold of the housing 10 is simple to manufacture and use, thereby reducing the cost and the time requirement.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector comprising:

an insulative housing defining a lengthwise direction and a lateral direction thereof;

a first opening and a second opening being formed in the insulative housing with a bar therebetween, the first opening and the second opening aligned with each other in the lengthwise direction while both offset toward one side of the housing along the lateral direction;

shorter and longer type terminals disposed in the housing, solder portions of the first and second type terminals being arranged in a single row, along the lateral direction, closer to the first opening, the solder portions of all the shorter terminals being equidistantly spaced from one another without any solder portions of the longer terminals interwoven therewith, each of the shorter terminals extending from the corresponding solder portion along the lengthwise direction with a contact portion exposed in the first opening, each contact portion of the shorter terminals extends toward said bar formed between the openings, all longer terminals extending from the corresponding solder portions along the lengthwise direction, which are located by at least one side of the solder portions of the shorter terminals, with contact portions exposed in the second opening and respectively aligned with the contact portions of the corresponding shorter terminals in the lengthwise direction, said contact portions of all the longer terminals extend away from said bar formed between the openings; wherein each of the longer terminals includes an arm between the corresponding solder portion and contact portion, and the arm extends in said lateral direction toward the second opening.

* * * * *